March 25, 1969 J. GIRAULT ET AL 3,435,448

MAGNETIC CODER FOR TRANSMITTING THE ANGULAR POSITION OF A SHAFT

Filed April 13, 1965 Sheet 1 of 4

March 25, 1969 J. GIRAULT ET AL 3,435,448

MAGNETIC CODER FOR TRANSMITTING THE ANGULAR POSITION OF A SHAFT

Filed April 13, 1965 Sheet 3 of 4

United States Patent Office 3,435,448

Patented Mar. 25, 1969

3,435,448
MAGNETIC CODER FOR TRANSMITTING THE ANGULAR POSITION OF A SHAFT

Jean Girault and Jean Pandelle, Paris, France, assignors to CSF—Compagnie Generale de Telegraphie sans Fil, a corporation of France Filed Apr. 13, 1965, Ser. No. 447,682
Claims priority, application France, Apr. 15, 1964, 970,982
Int. Cl. G08c *21/00;* H03k *13/00*
U.S. Cl. 340—347 3 Claims

ABSTRACT OF THE DISCLOSURE

A magnetic coder for transmitting the angular position of a shaft comprising a stator and a rotor. The stator comprises at least one inducing winding and two cores having peripheral teeth. Induced windings are wound about the teeth. The stator cores have respective teeth in register. The rotor is solid with the shaft and comprises two parts, magnetically coupled respectively with the teeth of the first and the second core. The parts of said rotor are angularly shifted.

The present invention relates to magnetic coders intended for translating the angular position of a shaft into a code number, for example a binary number.

Such coders may be obtained by magnetically coupling an inducing winding and an induced winding, wound about the teeth of a stator or a rotor.

The inducing winding is fed by a reference voltage. The path of the magnetic flux extends through a rotor, solid with the shaft whose angular position is to be coded, and one of the stator teeth. The induced windings provide voltages which are respectively representative of the various digits.

The winding direction of the winding coils which provide digits of the first significant column is reversed every other tooth.

The winding direction of the coils which provide the digits of the second significant column, the third significant column and so on, is reversed every two teeth, every four teeth and so on.

It is to be noted that a particular problem arises in the case of the binary code: as a count takes place and the binary number is increased by one unit, several binary digits may have to change from 1 to 0 or the reverse. Any lack of simultaneity in this substitution of digits of one kind for digits of the other kind may result in errors.

It is an object of the invention to provide a coder of the above type wherein this drawback is avoided.

According to the invention, there is provided a device for translating the angular position of a shaft into a binary number comprising at least one magnetic coder comprising a first inducing winding and a plurality of induced windings numbered from 0 to *n*, wound about the teeth of a stator, the winding direction being reversed every $2^i$ teeth, for the winding numbered *i*, *i* being comprised between 0 and *n* and, the magnetic flux path extending through the stator and a rotor coextensive with one tooth, wherein the coder generating the lowest significant digits comprises a first and a second stator portion mounted on a common sleeve carried by the same shaft, their respective teeth being in register, said winding numbered 0 being wound about the teeth of said first stator; and means angularly shifting the flux induced by said rotor in the windings providing the lowest significant digits with respect to the windings.

For a better understanding of the invention and to show how the same may be carried into effect reference will be made to the drawing accompanying the following description and wherein.

Figure 1:
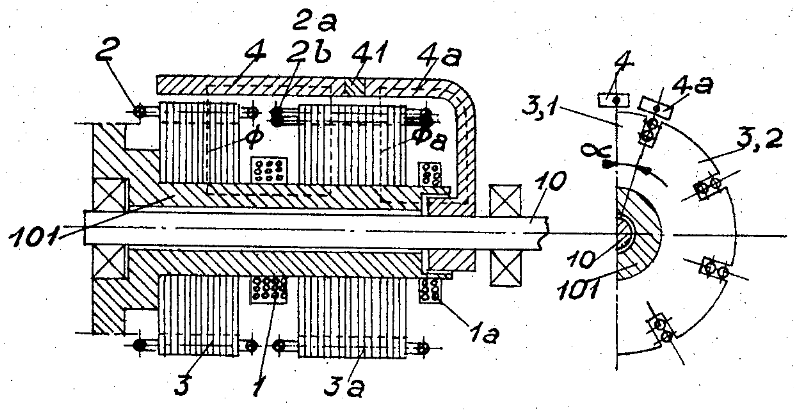
FIG. 1 shows in diametral and transverse sections a magnetic coder with two stator cores according to the invention.

In the embodiment of FIG. 1, an inducing winding 1 through which the rotor shaft 10, whose position is to be coded, extends, is fed with an alternating voltage U of suitable frequency by a power supply (not shown) common to all the coders of the chain, if the latter comprises a plurality of coders. This power supply preferably is an oscillator tuned to the desired frequency and associated with a power push-pull amplifier, for example.

Its phase is used as reference for the coder.

An induced winding 2 is located in the slots of a stator core 3 coaxial with shaft 10, the coils of the respective slots being wound in opposition and connected in series. Core 3 is in the drawing at the left of the inducing winding. It has for example eight slots.

A second stator core 3*a*, coaxial with shaft 10, is situated at the right of winding 1. It has the same number of slots as stator 3 and the slots of the two stators are in register. In its eight slots are wound six coils consisting each of a few turns, connected in series-opposition, i.e. in the same manner as the coils of stator 3. Four of these coils form a winding $2_a$ and two coils forming a winding $2_b$.

The coils of winding 2 surround each tooth 3.1 to 3.8 of core 3, while the coils of windings $2_a$ and $2_b$ respectively surround two and four successive teeth of core $3_a$.

A magnetic bridge 4, carried by shaft 10, closes the path of the main flux $\varphi$ passing through the magnetic sleeve 101, core $3_a$, windings $2_a$ and $2_b$ and core 3 through winding 2.

An auxiliary inducing coil $1_a$, coaxially positioned on the right hand face of core $3_a$, produces a magnetic flux $\varphi_a$, about half as strong as $\varphi$, which closes in core $3_a$ through winding $2_a$ and $2_b$ and along a magnetic arm $4_a$ fixed on shaft 10 and making an angle $\alpha$ with the magnetic bridge 4. They are joined together, for example, by means of a plastic coupling piece 41 and form a rotor.

Coil $1_a$ is fed with an alternating voltage obtained by transformation of the supply to coil 1 by a circuit, described further on, whose purpose is to synchronise the auxiliary inductor signal with the voltage induced in winding 2.

The operation of the coder according to the invention will now be described by means of FIGS. 2 to 5, as far as known arrangements are concerned.

Figures 2, 3, 4:
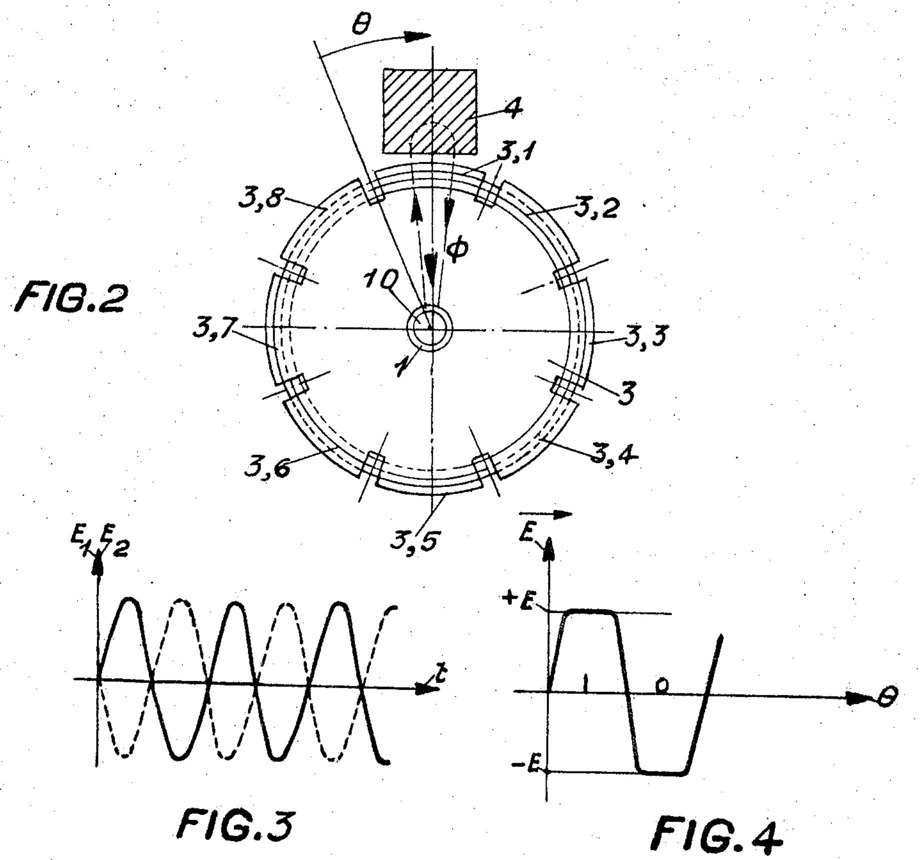
FIG. 2 shows diagrammatically a stator core and a rotor.
FIGS. 3 and 4 are diagrams of the induced voltage, respectively in time and in space.

When the magnetic piece 4 is in front of a tooth 3.1, 3.2 . . . or 3.8, the coil wound about this tooth delivers at its terminals an induced voltage E of the same frequency as voltage U at the terminals of inductor 1 and in phase or in phase opposition with voltage U depending on the direction of the winding of the coil carried by the tooth in front of which the magnetic piece lies at the considered instant, as shown in FIG. 3. E will designate a voltage in phase with voltage U and −E a voltage in phase opposition with U. The full line curve shows the variation with time of the voltage $E_1$ corresponding to the closing of the path of flux $\varphi$ by tooth 3.1, or by another tooth having an odd reference numeral. The dotted line curve of FIG. 3 corresponds to the case when part 4 happens to be opposite tooth 3.2 of FIG. 2, or opposite another tooth having an even reference numeral. Voltage $E_2$ is a phase opposition with voltage $E_1$.

FIG. 4 shows, as a function of the angular position $\theta$ of the magnetic part 4 moving along the teeth, the voltage E collected at the terminals of winding 2. E varies between +E, when arm 4 is in front of a tooth of odd rank and −E, when the arm is before a tooth of even rank.

The positive alternation may be used as a coded representation of 1 and the negative as a coded representation of 0.

Figure 5:
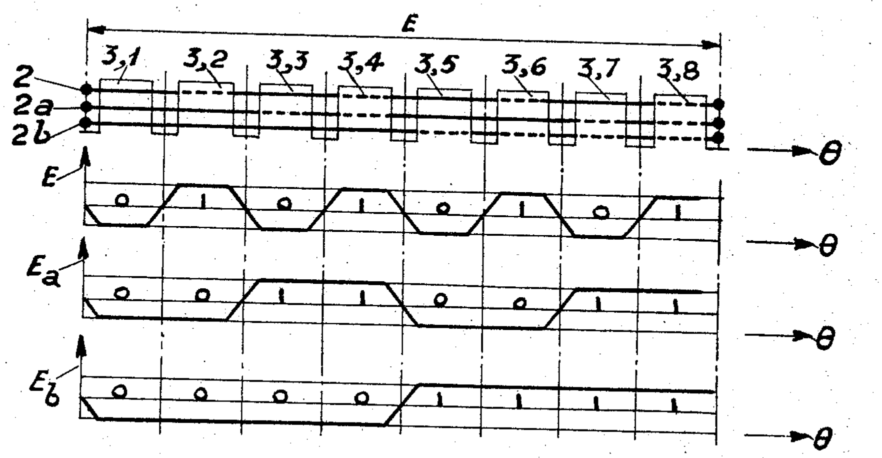
FIG. 5 shows the developed induced winding of the core of FIG. 2 and the induced voltage as a function of the rotor angular position.

Similarly FIGS. 2 and 5 show that windings $\mathbf{2}_a$ and $\mathbf{2}_b$, whose winding directions are respectively reversed every other tooth and every fourth tooth, provide a coded representation of two further digits $E_a$ and $E_b$.

The combined three digits E, $E_a$ and $E_b$ form a number of 3 figures in natural binary code.

It is of course possible to reshape the alternating signals E, $E_a$ and $E_b$ to stepped electrical signals, for example of a constant negative voltage for FIG. 1 and zero voltage for the cypher zero.

This transformation is obtained by means of the electronic circuit of which examples will be given further on.

FIG. 5 illustrates wave forms of voltages E, $E_a$ and $E_b$ corresponding to the rotary coder shown in FIG. 2, below a development of the periphery of teeth 3.1 to 3.8; this provides the possibility of reading, from left to right, numbers from 0 to 7 as three-figure natural binary numbers.

As already mentioned, the coder according to the invention includes in addition at least one further inductor system, consisting of a second coil $\mathbf{1}_a$ and arm $\mathbf{4}_a$ which cooperates only with coils $\mathbf{2}_a$ and $\mathbf{2}_b$ to the exclusion of coil 2 wound separately on core 3.

The corresponding flux $\varphi_a$ propagates through the magnetic arm $\mathbf{4}_a$ which is offset with respect to magnetic bridge 4 by an angle $\alpha$. This produces a shift of voltages $E'_a$ and $E'_b$ induced by flux $\varphi_a$ in windings $\mathbf{2}_a$ and $\mathbf{2}_b$ as a function of $\theta$, with respect to voltages $E_a$ and $E_b$ induced by the main flux $\varphi$ in the same windings.

The auxiliary inductor winding $\mathbf{1}_a$ is fed with a voltage S in phase with the voltage delivered by winding 2. It will be shown further on how, in order to obtain this voltage S, voltage E collected at the terminals of winding 2 is reshaped in a circuit which produces sudden phase reversal in sycnhronism with flux $\varphi$.

Figure 6:
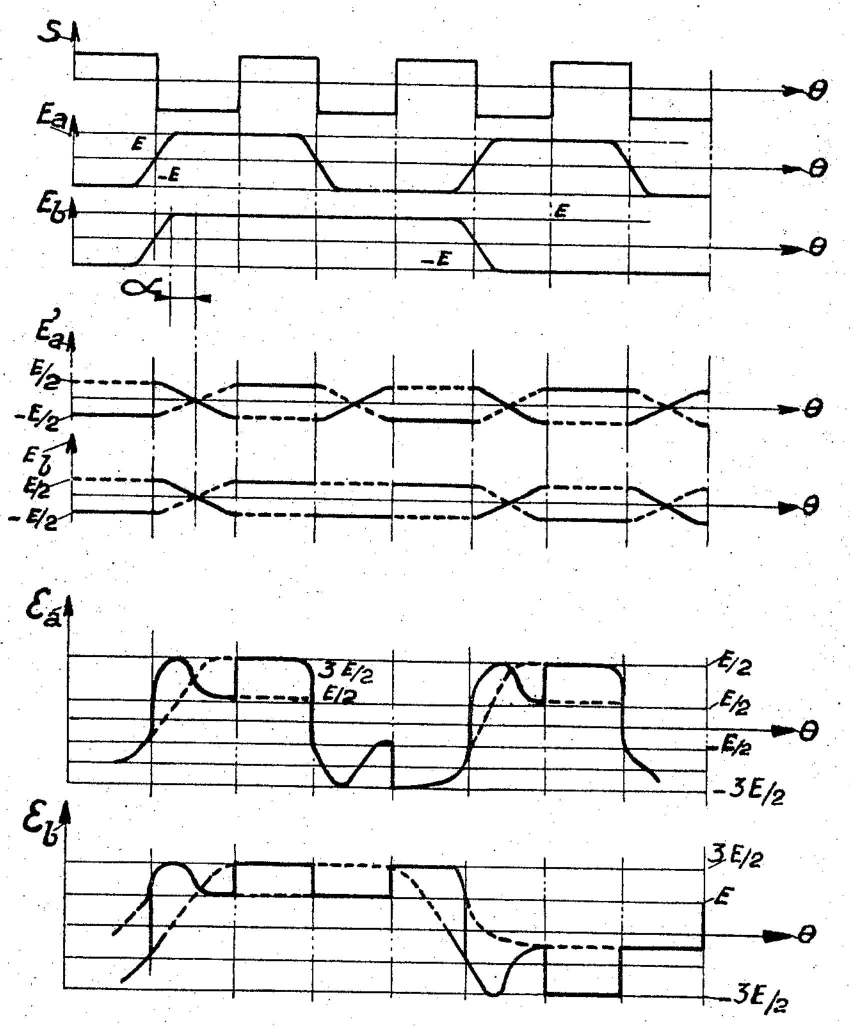
FIG. 6 shows explanatory curves.

FIG. 6 shows voltages $E_a$ and $E_b$ produced by flux $\varphi$ alone in coils $\mathbf{2}_a$ and $\mathbf{2}_b$ respectively; voltages $E'_a$ and $E'_b$ produced by the auxiliary flux $\varphi_a$ alone in the same coils; and voltages $\epsilon_a$ and $\epsilon_b$ resulting from the simultaneous action of fluxes $\varphi$ and $\varphi_a$.

It will be noted that voltages $E'_a$ and $E'_b$, which vary between $-E/2$ and $+E/2$, while voltages $E_a$ and $E_b$ vary between −E and +E, undergo a phase shift by 180° at the same time as voltage S. Further, they are offset with respect to voltages $E_a$ and $E_b$ by an angle substantially equal to $\alpha$.

Voltages $\epsilon_a$ and $\epsilon_b$ have an amplitude which varies between $\pm E/2$ and $\pm 3E/2$, and their phase reverses at the same time as that of voltages E and S, so synchronizing the coder digits.

It is to be noted that the angular shift between the two arms 4 and $\mathbf{4}_a$ is essential for the case when, owing to even a small angular difference between the respective settings of cores 3 and $\mathbf{3}_a$, or between the induced windings, the zeros signal $E(\theta)$ should happen to lag behind the zeros of signals $E_a$ and $E_b$. The digits of the highest weights would appear prematurely, and this is not acceptable in binary coding.

Figure 7:
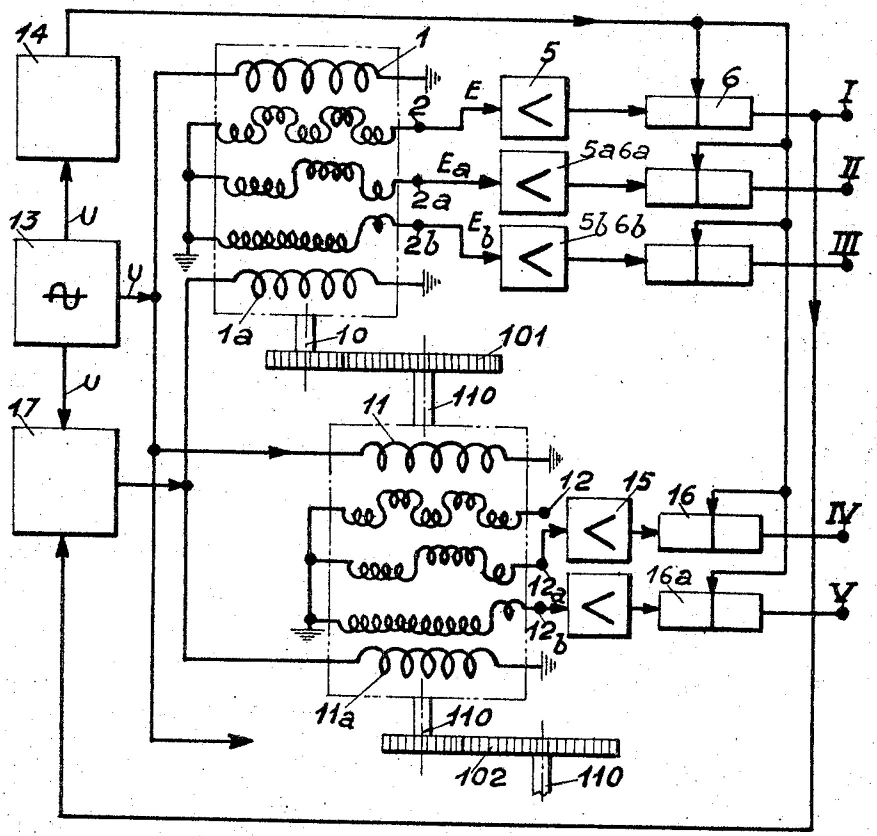
FIG. 7 shows a two coder arrangement according to the invention.

In FIG. 7, a coder with a structure as shown in FIG. 1 is symbolised by a cylindrical body and by the stator inductor 1, auxiliary inductor $\mathbf{1}_a$ and windings 2, and $\mathbf{2}_b$.

This first coder forms the fastest stage of a chain of coders stepped down with respect to each other.

As an example, a single slower coder is shown schematically; its rotor shaft 110 is coupled to shaft 10 of a faster coder by a gear train 101.

The structure of the slower coders is identical to that of the faster coder in the chain, to simply manufacture and maintenance and the slower coder contains the same windings, as the faster one i.e. 11 and $\mathbf{11}_a$, 12, $\mathbf{12}_a$ and $\mathbf{12}_b$. In fact winding $\mathbf{11}_a$ is not used in the slower coder.

An oscillator 13 feeds an alternating voltage U to the respective inductor windings 1, 11 of the coders.

Figure 8:
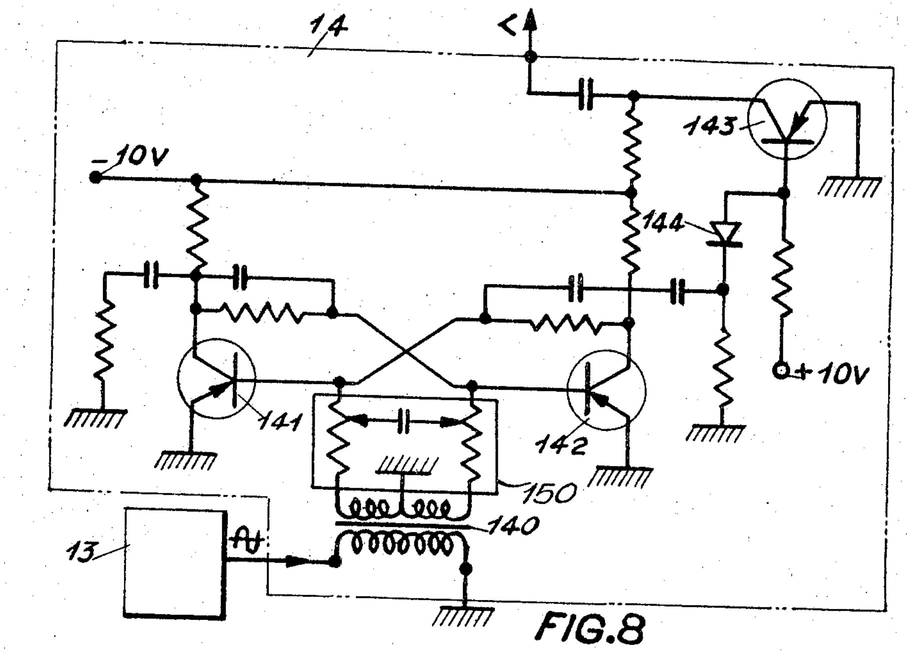
FIG. 8 shows in detail a part of the above circuit.

The signals at the output terminals of windings 2, $\mathbf{2}_a$, $\mathbf{2}_b$ are applied, through amplifiers 5, $\mathbf{5}_a$ and $\mathbf{5}_b$, to the same number of bistable circuits 6, $\mathbf{6}_a$ and $\mathbf{6}_b$. Each of these circuits is tripped from one state into the other upon reception of a pulse obtained from voltage U at times determined by a phase sensitive circuit 14 which will be described further on (FIG. 8).

The induced windings outputs $\mathbf{12}_a$, $\mathbf{12}_b$ . . . of the slow coder are connected in a similar manner to bistable circuits $\mathbf{16}_a$, $\mathbf{16}_b$.

The output I of bistable circuit 6 is connected to one input of a generator of square signals 17 which receives at its other input the voltage U delivered by oscillator 13.

Generator 17 feeds the auxiliary inductor windings $\mathbf{1}_a$, $\mathbf{11}_a$ of the coder with square signals whose phase is controlled by circuit 6.

Each output I to V of the bistable circuits (FIG. 7) gives a digit 1 or a digit 0, depending on the state of the circuit 6 to $\mathbf{16}_a$. The set of digits constitutes the code number corresponding to the angular position of shaft 10.

The synchronisation of the resulting digits I to V will now be described.

Among the induced windings of the faster coder, winding 2 is the only one which is submitted only to the action of the main flux $\varphi$ produced by inductor winding 1. Bistable circuit 6 changes its state when, as rotor magnetic bridge 4 passes in front of a fresh tooth of stator 3, the phase of the induced voltage reverses with respect to that of the inductor voltage U. But this reversal is progressive, corresponding to sloping fronts in FIG. 5.

The synchronising pulse, released for example at a maximum of the voltage U, determines the exact instant for the tripping of flip-flop 6. Actually, amplifier 5, which may, for example, be of the symmetrical saturable preamplifier type, delivers a voltage which, according to the amplitude of the alternating voltage E from coil 2, has a sinusoidal or a square shape, but whose amplitude is intentionally limited at a level which alone cannot trip the flip-flop 6 in one direction or the other.

As the sampling pulses are added to the output voltage of amplifier 5, they release one or the other of the transistors in the bistable circuit 6. The sampling pulses which occur only near the maximum of voltage U, used as phase reference, leave once per period, the bistable circuit unaltered, or trip it. As a result, the circuit 6 transforms alternating voltage E or −E, as shown in FIG. 3, to a zero or negative voltage, depending upon whether voltage E is in phase or in opposition with the reference voltage U. This produces at output I of flip-flop 6 a first digit which takes the form of a square signal shown at the top of FIG. 6.

In its turn, the state of flip-flop 6 controls the condition of the square signal S produced by generator 17, a signal which feeds the auxiliary windings $\mathbf{1}_a$, $\mathbf{11}_a$ . . . of the faster coder. But, as mentioned above, it is the phase reversal of voltages $E'_a$, $E'_b$ . . . induced by the auxiliary inductor windings that determines the phase reversal of the resulting voltages $\epsilon_a$, $\epsilon_b$. Consequently, due to the synchronisation as performed according to the invention, the changes of state are produced on the various flip-flops for the same position of the shaft, determined with precision by the instant of the change of state of flip-flop 6 of the stage of lowest weight of the faster coder.

FIG. 8 shows in detail a circuit 14 sensitive to the phase of voltage U provided by oscillator 13.

A balanced transformer 140 receives voltage U at the input. The ends of its secondary winding are respectively connected to the bases of transistors 141 and 142 connected to build up a flip-flop and with their emitter grounded. An adjustable phase shifter 150 is inserted between the bases of these transistors. The collector of each transistor is connected to the base of the other through a differentiating circuit. A transistor 143, forming the output amplifier stage, delivers a pulse at the output of circuit 14 when a diode 144, inserted between its base and the collector of one of the flip-flop transistors (e.g. 141), is unblocked. The phase shifter is used for adjusting, with respect to the reference phase U, the phase of the voltages in the collector circuits of transistors 141 and 142. The negative edges of these voltages, differentiated in the CR networks, supply the same number of inverted pulses which are amplified by stage 143.

The figure shows a single diode 144 on the assumption that only one pulse required per period at the output of 14. The position of this pulse is set by the phase shifter, preferably near the maximum of the voltage U. Naturally should two pulses per period be required all that would be necessary is to insert a diode (not shown) between the base of 134 and the collector of 142.

Of course, the invention is not limited to the embodiment described and shown which were given solely by way of example.

Thus the arrangement which is used for insuring the simultaneity of the changer of the digits of the lowest significant column with the changer of diigts of the other columns may be repeated for the digits of the second, or others columns.

What is claimed is:

1. In a device for translating the angular position of a shaft into a binary number: at least one magnetic coder comprising a stator having peripheral teeth, first inducing winding means, a plurality of induced windings numbered from 0 to *n* wound about said teeth, the winding direction being reversed every $2^i$ teeth for the winding numbered *i, i* being comprised between 0 and *n,* said induced windings having respective output terminals providing respective voltage representing the digits of said number; a rotor, solid with said shaft, and magnetically coupled with said teeth; said peripheral teeth of said stator comprising a first and a second part having respective teeth in register; said winding numbered 0 being wound about the teeth of said first part; the other windings being wound about the teeth of the second part; and means for angularly shifting the rotor angular position relatively to the teeth of said first part with respect to the rotor angular position relatively to the teeth of said second part.

2. In a device for translating the angular position of a shaft into a binary number: at least one magnetic coder comprising a stator having a plurality of peripheral teeth, first inducing winding means and a plurality of induced windings, numbered from 0 to *n* about said teeth, the winding direction being reversed every $2^i$ teeth for the winding numbered *i, i* being comprised between 0 and *n*; a rotor solid with said shaft and magnetically coupled with said teeth; said peripheral teeth of said stator comprising a first and a second part having respective teeth in register, said winding numbered 0 being wound about the teeth of said first part, the other windings being wound about the teeth of said second part; said rotor comprising a first and a second part angularly shifted with respect to each other, said first rotor part being magnetically coupled with said first and said second stator part and said second rotor part being magnetically coupled with said second stator part only.

3. In a device for translating the angular position of a shaft into a binary number: at least one magnetic coder comprising a stator having a plurality of peripheral teeth, first inducing winding means and a plurality of induced windings, numbered from 0 to *n,* wound about said teeth, the winding direction being reversed every $2^i$ teeth for the winding number *i, i,* being comprised between 0 and *n;* a rotor solid with said shaft and magnetically coupled with said teeth; said peripheral teeth of said stator comprising a first and a second part having respective teeth in register, said winding numbered 0 being wound about the teeth of said first part, the other windings being wound over the teeth of said second part; said rotor comprising a first and a second part angularly shifted with respect to each other, said first rotor part being magnetically coupled with said first stator part and said second rotor part being magnetically coupled with said second stator part only; a further inducing winding in said second stator part; and means for feeding to said winding a voltage in phase with the voltage provided by said winding numbered 0.

References Cited

UNITED STATES PATENTS

| | | | |
|---|---|---|---|
| 3,099,830 | 7/1963 | Wayman | 340—347 |
| 3,171,104 | 2/1965 | Norton et al. | 340—347 |
| 3,226,711 | 12/1965 | Lautzenhiser | 340—347 |

MAYNARD R. WILBUR, *Primary Examiner.*

JEREMIAH GLASSMAN, *Assistant Examiner.*